(12) United States Patent
Gerlitz et al.

(10) Patent No.: US 11,680,810 B2
(45) Date of Patent: Jun. 20, 2023

(54) BATTERY-OPERATED VEHICLE ROUTE DETERMINATION

(71) Applicant: Ford Global Technologies, LLC, Dearborn, MI (US)

(72) Inventors: Thomas Gerlitz, Aachen (DE); Timothy C. Bettger, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 67 days.

(21) Appl. No.: 17/121,897

(22) Filed: Dec. 15, 2020

(65) Prior Publication Data

US 2021/0231448 A1 Jul. 29, 2021

(30) Foreign Application Priority Data

Jan. 28, 2020 (DE) .................. 102020101980.7

(51) Int. Cl.
| | |
|---|---|
| *G01C 21/34* | (2006.01) |
| *B60L 58/12* | (2019.01) |
| *G01C 21/36* | (2006.01) |
| *B60L 50/50* | (2019.01) |
| *B60Q 9/00* | (2006.01) |
| *B60L 3/00* | (2019.01) |

(52) U.S. Cl.
CPC ............ *G01C 21/3469* (2013.01); *B60L 3/00* (2013.01); *B60L 50/50* (2019.02); *B60L 58/12* (2019.02); *B60Q 9/00* (2013.01); *G01C 21/3626* (2013.01); *G01C 21/3679* (2013.01)

(58) Field of Classification Search
None
See application file for complete search history.

(56) References Cited

U.S. PATENT DOCUMENTS

| | | | | |
|---|---|---|---|---|
| 8,838,318 | B2 * | 9/2014 | Segawa ............. | G01C 21/3676 701/22 |
| 9,079,507 | B2 * | 7/2015 | Smith ...................... | B60L 50/66 |
| 9,132,746 | B2 * | 9/2015 | Enomoto ........... | G01C 21/3682 |
| 10,048,082 | B2 * | 8/2018 | Meyer ................ | G01C 21/3469 |
| 10,190,882 | B2 | 1/2019 | Jones | |
| 10,571,287 | B2 * | 2/2020 | Moore ................ | G01R 21/133 |
| 10,852,737 | B2 * | 12/2020 | Szubbocsev ............ | B60L 58/16 |
| 10,866,108 | B2 * | 12/2020 | Pedersen .............. | G05D 1/0088 |
| 10,989,550 | B2 * | 4/2021 | Cha ........................ | B60W 20/16 |

(Continued)

*Primary Examiner* — Todd Melton
(74) *Attorney, Agent, or Firm* — Frank A. MacKenzie; Bejin Bieneman PLC

(57) ABSTRACT

A maximum required electric energy for operating a vehicle along a final section of the route under electric power alone when using a specified number of electrically operated devices is estimated. A maximum total electric energy required to operate the vehicle along the route is estimated. An alternate route is determined based on determining the detected stored electric energy is less than the estimated maximum total electric energy required to operate the vehicle along the route. The alternate route is determined based on an estimated maximum total electric energy required to operate the vehicle along the alternate route being greater than or equal to the detected stored electric energy. One of a) the determined alternate route, or b) based on determining no alternate route exists, a notification is output via a human/machine interface.

20 Claims, 2 Drawing Sheets

(56) References Cited

U.S. PATENT DOCUMENTS

| | | | |
|---|---|---|---|
| 2013/0151046 A1* | 6/2013 | Choi | G08G 1/096827 |
| | | | 903/902 |
| 2017/0028912 A1 | 2/2017 | Yang et al. | |
| 2017/0313321 A1* | 11/2017 | Asakura | B60W 30/18 |
| 2018/0170382 A1 | 6/2018 | Soliman et al. | |
| 2021/0055120 A1* | 2/2021 | Roth | G06Q 10/08355 |

* cited by examiner

BATTERY-OPERATED VEHICLE ROUTE DETERMINATION

CROSS-REFERENCE TO RELATED APPLICATIONS

This patent application claims priority to German Patent Application 102020101980.7, filed Jan. 28, 2020, which is hereby incorporated herein by reference in its entirety.

BACKGROUND

Automated driving functions for motor vehicles are becoming increasingly popular. These include, for example, functions such as automatic parking, parking-assistance functions, remote-controlled parking or home zone parking functions. At the same time, electrically powered vehicles and vehicles with a hybrid drive are used more and more frequently. Automated driving functions typically use a number of sensors, for example, ultrasound sensors, cameras, radar sensors, and/or lidar sensors with which the surroundings of the vehicle including the presence of static or dynamic obstacles is detected. The said driver assistance functions use this information to find a free parking space, for example, and to specify a suitable trajectory for parking. The user can configure the assistance functions via an associated human/machine interface (HMI) to implement a parking maneuver, for example. In this case, the HMI can be located within the vehicle or on an electronic control device (ECD), for example, a smart phone or other mobile equipment.

Whilst, in vehicles which comprise an internal combustion engine, the use of automated driver assistance functions has only an insubstantial influence on the fuel consumption and, therefore, barely affects the possible range of the vehicle with the fuel available. The use of driver assistance functions in vehicles which are predominantly or exclusively electrically powered has a decisive influence on the possible range of the vehicle for the respective charge state of the battery. In this case, it is of particular significance if the final section of a planned route is to be covered under electric power alone and, at the same time, certain automated driving functions or driver assistance functions are to be usable, for example, an automated parking procedure is to be implemented at a charging column. If the charge state is too low in this case to complete the planned maneuver via an automated driving function, this can result in the vehicle having to be left in a non-drivable state. This is an undesired state for the user.

Methods for estimating the range of an electrically powered vehicle are disclosed, for example, in documents U.S. Pat. No. 10,190,882 B2 and US 2017/0028912 A1.

SUMMARY

The present disclosure relates to a method for determining a route for a vehicle, which is at least to some extent powered electrically and comprises at least one battery. The disclosure can provide an advantageous method for determining a route for a vehicle which is at least to some extent powered electrically, in which the possible use of automated driving functions at the target location and the charge state of the battery are taken into account.

The method for determining a route relates to a vehicle, which is at least to some extent powered electrically and comprises at least one battery. The vehicle can be, for example, a vehicle with a hybrid drive, in particular a hybrid motor vehicle, an electric vehicle, in particular an electric motor vehicle, an electrically powered bike, a motor bike, a moped, a transporter, a bus, a van, a truck or a ship.

The method includes the following steps: detecting an electric energy currently stored in a battery. In other words, the current charge state of the battery is detected. The method further includes specifying a target location. The method further includes then specifying a route to the specified target location. The method further includes specifying a final section of the route prior to reaching the target location, which section is to be covered under electric power alone. The method further includes specifying a number of electrically operated devices and/or functions, which are to be usable when covering the final section of the route. This can take place automatically or on the basis of usage preferences. In this case, for example, automated or autonomous driving functions, driver assistance functions, displays, audio equipment, lighting, etc., can be specified, which are to be available to a user when covering the final section of the route, e.g., to enable required driving maneuvers to be safely executed at the target location or to reach the target location. For example, the average energy consumption of previous automated maneuvers which are executed at the end of a driving cycle can be determined and the corresponding energy can be reserved, e.g., the energy required for automated parking in a narrow parking space in front of a charging column. The average energy consumption of previous automated maneuvers which were executed at the end of a driving cycle can also be determined independently of specifying a target location and counted as an energy reserve or taken into account as part of the range estimate.

The method further includes estimating the maximum required electric energy for covering the final section of the route under electric power alone when using the specified number of electrically operated devices and/or functions. In this case, in particular, potential unfavorable surrounding conditions at the target location and/or its surroundings can be taken into account, in particular such as weather conditions, the presence of upward and downward slopes or a complex parking situation. The method further includes estimating the maximum total electric energy required to cover the entire route. The maximum required electric energy, estimated in the previous section, for covering the final section under electric power alone is included as part of this estimate, i.e. it is included in the estimated maximum total electric energy.

The method further includes, if the detected stored electric energy is less than the estimated maximum total electric energy, determining whether an alternative route exists for which the detected stored electric energy is not less than the estimated maximum total electric energy. The method further includes, if an alternative route exists, outputting at least one alternative route via a human/machine interface (HMI). The method further includes, if no alternative route exists, outputting a notification via the HMI. The output can take place, for example, via a display, audio equipment, or in audiovisual form. If a notification is output to say that no alternative route exists, i.e., the target destination cannot be reached in the planned way using electric power, a notification referring to a charging option along the route or in the vicinity of the route can be given, for example, or suggestions relating to the restricted use of the specified electrically operated devices and/or functions can be output.

The method described has the advantage that, as part of the range estimate for a specific route, it takes into account that the destination should or must be reached under electric power alone, for example, and certain assistance functions needing electric energy or further electrically operated devices or equipment should be usable to reach the target location. In particular, the described method takes into account that existing or future legal requirements relating to the reduction and prevention of harmful emissions in certain areas demand an exclusively electric drive, for example, in inner-city regions, in underground garages, or in areas with high-street stores. This is taken into account in the present case when planning the route and in an associated range estimate and can additionally be specified by a user. Therefore, a user can specify, for example, that he would like to drive his vehicle using electric power alone in the area in which he lives, e.g., in the region surrounding his house and/or his garage or another parking option. The present disclosure enables convenient implementation of this request.

Additions and further developments to the method described above are presented below. In a first example, the method can further include, if the detected stored electric energy is less than the estimated maximum total electric energy, estimating the minimum required electric energy for covering the final section of the route under electric power alone when using the specified electrically operated devices and/or functions. The method can further include estimating the minimum total electric energy required to cover the entire route, i.e., including the minimum required electric energy, estimated in the previous step, for covering the final section under electric power alone. The method can further include, if the detected stored electric energy is less than the estimated minimum total electric energy, determining whether an alternative route exists for which the detected stored electric energy is not less than the estimated minimum total electric energy. The method can further include, if an alternative route exists, outputting at least one alternative route. The method can further include, if no alternative route exists, outputting a notification. The outputs preferably take place via the HMI.

In addition to the examples described, in a further example, the method can further include, if the detected stored electric energy is less than the estimated maximum total electric energy, selecting specified electric devices and/or functions which necessarily have to be usable when covering the final section of the route. The method can further include then estimating the maximum required electric energy or the minimum required electric energy for covering the final section of the route under electric power alone when using only the previously selected electrically operated device and/or functions.

The method can further include estimating the maximum or minimum total electric energy required to cover the entire route, including the maximum or minimum required electric energy, estimated in the previous step, for covering the final section under electric power alone. The method can further include, if the detected stored electric energy is less than the necessary maximum or minimum total electric energy estimated in the previous step, determining whether an alternative route exists for which the detected stored electric energy is not less than the estimated maximum or minimum total energy. The method can further include, if an alternative route exists, outputting at least one alternative route. The method can further include, if no alternative route exists, outputting a notification via the HMI.

The examples described above can therefore be implemented starting with the maximum required electric energy for covering the final section of the route under electric power alone, and the maximum total electric energy can be estimated on the basis thereof. Additionally, or alternatively, the method can be implemented starting with the estimate of the minimum required electric power energy for covering the final section under electric power alone, and the minimum total electric energy can be estimated on the basis thereof.

In a further example, the method can be implemented analogously to the examples described above, however starting with an estimated minimum total electric energy. In this example, the method can further include, if the detected stored electric energy is less than the estimated minimum total electric energy, selecting the specified electrically operated devices and/or functions which necessarily have to be usable when covering the final section of the route. Therefore, in other words, functions such as interior lighting or the use of audiovisual entertainment equipment or the charging of mobile devices can be suspended whilst covering the final section. The method can further include estimating the maximum or the minimum required electric energy for covering the final section of the route under electric power alone when using only the selected electrically operated devices and/or functions. The method can further include estimating the maximum or minimum total electric energy required to cover the entire route, i.e. including the maximum or minimum required electric energy, estimated in the previous step, for covering the final section under electric power alone.

The method can further include, if the detected stored electric energy is less than the necessary maximum or minimum total electric energy estimated in the previous step, determining whether an alternative route exists for which the detected stored electric energy is not less than the estimated maximum or minimum total electric energy. The method can further include, if an alternative route exists, outputting at least one alternative route. The method can further include, if no alternative route exists, outputting a notification. The outputs preferably take place via the HMI.

The examples described above have the advantage that they provide a user with different options which enable a planned target location to be reached on the existing battery charge whilst using assistance devices and/or further devices and functions in the immediate surroundings of the target location and enable the use of assistance devices and/or further devices and functions to be restricted if necessary. In principle, the final section can be individually specified in kilometers by a user or specified as a default, for example, 1 kilometer prior to reaching the destination, or depending on emission regulations.

In a further example, the method can further include determining a route from the target location to a nearest charging station. The method can further include estimating the electric energy still stored upon arriving at the target location, i.e., the charge state of the battery. The method can further include estimating the electric energy required to reach the nearest charging station from the target location and, if the estimated required energy is less than the estimated still stored electric energy upon reaching the target location, outputting a notification via the HMI. This example has the advantage that not only is whether the target destination can be reached taken into account, but, at the same time, the next charging option is also taken into account.

In a further example, the method can further include determining whether, during the journey to the target location, electric energy can be saved by the non-use and/or restricted use of certain devices and/or functions. The method can further include outputting a notification via the HMI as to which non-use and/or restricted use of particular devices and/or functions results in which energy saving. The method can further include, if the detected stored electric energy is less than the estimated maximum or minimum total electric energy, outputting a number of devices and/or functions whose use can be restricted and/or suspended during the journey via the HMI. The method can further include selecting a number of the outputted devices and/or functions which are to be restricted and/or suspended during the journey. The method can further include the estimating maximum and/or minimum total electric energy can subsequently be estimated based on the selected devices and/or functions.

The devices and/or the functions whose use can be restricted or suspended during the journey can include the maximum available drive torque, the volume of at least one speaker or other audio device, the brightness of at least one display, the air conditioning control, and/or a driver assistance function.

The method can further include determining at least one charging option along the route and outputting the at least one charging option via a HMI.

The computer program product comprises commands which, when the program is executed by a computer, prompt this to execute the method described above. The computer-readable storage medium comprises commands which, when executed by a computer, prompt this to execute the method described above. The device for data processing comprises a processor, which is configured such that it executes the method. The device for data processing can be, for example, an energy management system, for example of a motor vehicle. The computer program product, the computer-readable storage medium and the device for data processing have the advantages already mentioned as part of the method.

The vehicle is designed to execute the method. In addition or alternatively to this, the vehicle can comprise the device, described above, for data processing. The vehicle can be a motor vehicle, in particular a car, a truck, a bus, a van or a motor bike, or it can be a ship. The vehicle has the advantages already mentioned. It enables, in particular, an emission-conscious behavior of the user in inner city areas or in inhabited places and ensures that a final section of the route prior to reaching a selected target location is reliably covered under electric power alone.

SUMMARY OF THE DRAWINGS

The disclosure is explained in closer detail below with the aid of exemplary embodiments with reference to the accompanying figures. Although the disclosure is illustrated and described in greater detail by the preferred examples, the disclosure is not restricted by the examples disclosed and other variations can be derived therefrom by the person skilled in the art without departing from the scope of protection of the invention.

The figures are not necessarily precisely detailed or true to scale, and may be magnified or minimized to provide a clearer overview. Therefore, functional details disclosed here should not be understood as restrictive, but merely as a clear foundation which provides the person skilled in the art in this technological field with guidance for implementing the present invention in a variety of ways.

The expression "and/or" applied here when used in a series of two or more elements means that each of the specified elements can be used on their own, or any combination of two or more of the specified elements can be used. If, for example, a composition is described as containing the components A, B and/or C, the composition can contain A on its own; B on its own; C on its own; a combination of A and B; a combination of A and C; a combination of B and C; or a combination of A, B and C.

Figure 1:
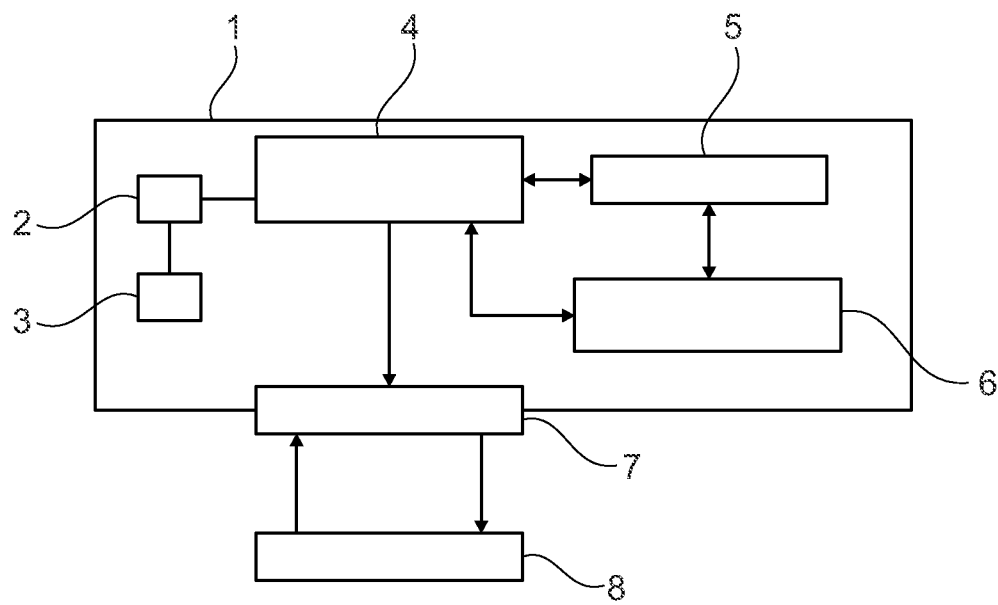

FIG. 1 shows a schematic illustration of an example vehicle.

Figure 2:
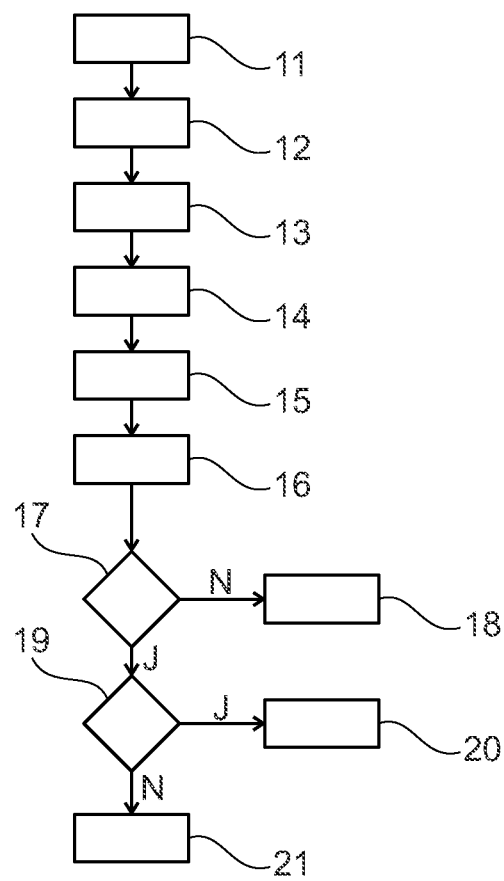

FIG. 2 shows a schematic illustration of an example method in the form of a flow chart.

Figure 3:
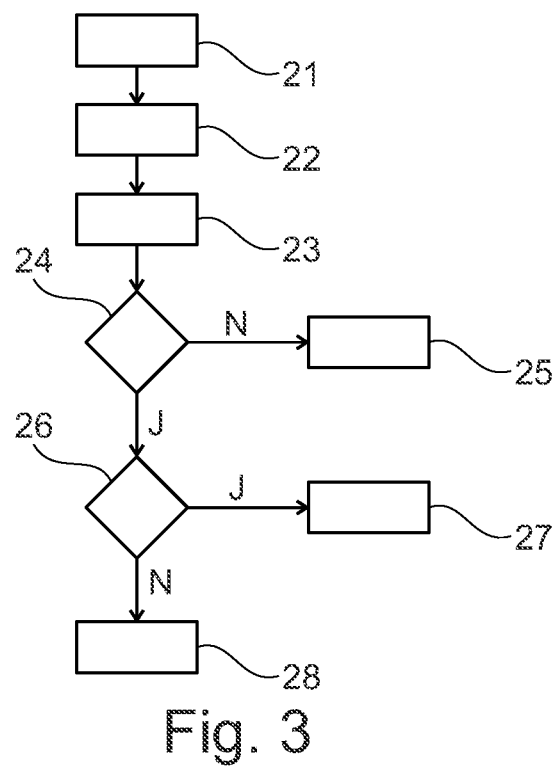

FIG. 3 shows a schematic illustration of an addition to the example method shown in FIG. 2 in the form of a flow chart.

Figure 4:
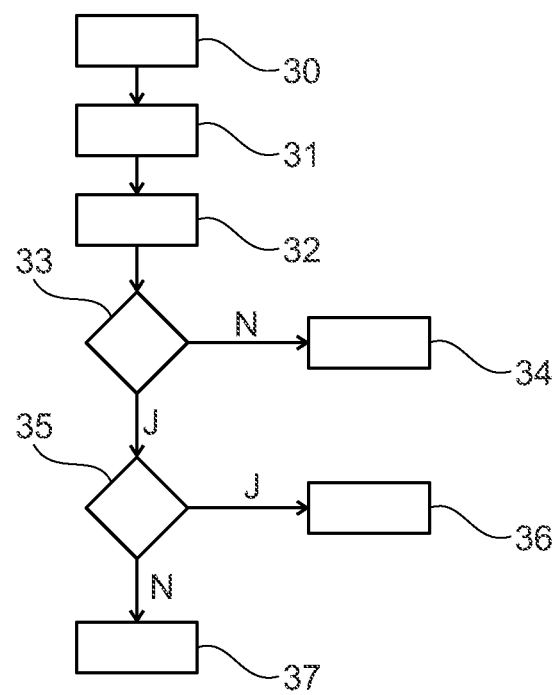

FIG. 4 shows a schematic illustration of an addition to the example methods shown in FIG. 2 or 3 in the form of a flow chart.

FIG. 1 shows a schematic illustration of an example vehicle 1. The vehicle 1 comprises at least one battery 2 which powers a drive train 3, at least to some extent exclusively. The vehicle 1 furthermore comprises a device for data processing 4, which can be, for example, an energy management system. A navigation system 5 and at least one device 6 which is exclusively electrically operated and enables driver assistance functions to be executed, for example, are furthermore present. The vehicle 1 furthermore comprises a human/machine interface (HMI) 7. Communication with a user 8 is possible via the HMI 7. A user 8 can also input data into the HMI 7 and data can be output, for example, audio-visually output, to a user 8 via the HMI 7. Data transfer between the device for data processing 4 and the HMI 7, between the device for data processing 4, the navigation system 5 and the exclusively electronically operated device 6 is moreover possible. This is denoted by arrows.

The data processing device 4 is designed to detect the charge state of the battery 2, to detect a route to a specified target location, which route is specified by the navigation system 5, and to detect electrically operated devices and/or functions, in particular driver assistance functions 6, which are available along the route to the target location. The device for data processing 4 is furthermore designed to estimate, in particular calculate, the expected electric energy consumption for the planned route based on the detected data and to output a range estimate to a user or driver 8 via the HMI 7. In this case, it is taken into account, in particular, which exclusively electrically operated devices and/or functions, in particular, driver assistance functions, displays, audio equipment, lighting devices etc., should be usable when covering a final section of the planned route. For example, if the driver 8 plans to drive home, or to drive to a charging station after a long journey, it can be taken into account or factored in that, at the end of the journey home, exclusively electrically operated automatic parking or further automated or autonomous driving maneuvers are to be implemented or, if arriving at the charging station, the vehicle 1 is to approach and park at the charging station in an automated or autonomous manner. Whether the electric energy present in the battery 2 is sufficient to implement the planned maneuvers at the end of the journey is taken into account as part of determining the route.

In another example, to reduce the energy consumption, an alternative route in which less energy is consumed can be sought and possibly suggested and/or the vehicle control can be adapted in such a way that certain assistance devices and/or functions are restricted in terms of their availability or are operated in an energy-saving mode. It can thus be ensured that the driver 8 reaches his target destination and yet the driving maneuvers to be implemented in a fully or partly autonomous or automated manner at the end of the journey can still be implemented. Such an adaptation can comprise, in particular, reducing the maximum available drive torque, deactivating the compressor of the air conditioning system, or other adaptations of the air conditioning control, or reducing the volume of an infotainment system or reducing the brightness of displays. The corresponding changes and adaptations can be implemented automatically or after a corresponding confirmation input by the user 8, in particular the driver.

In another example, in particular in cases in which insufficient energy is available to implement the planned automated driving maneuvers at the end of the planned journey, in particular within the normally calibrated limits of the charge state of the drive battery 2, the option exists of preferably further reducing the minimum charge state of the battery 2 to implement the planned maneuvers after a corresponding confirmation by the user 8. In this example, the user 8 should be made aware that the battery 2 needs to be charged to a minimum charge state before the next journey. Such an option can be offered dynamically, for example, based on an input from an external source relating to the state of a charging station at the planned target location. For public charging stations, this can be offered via a cloud-based service of the station operator, wherein, in particular, information relating to the availability and the charge status of the specific charging station can be shared with the user 8 and drawn upon for him to make his decision. If, for example, all charging stations are currently being used, the user 8 can be informed that a corresponding reduction in the minimum battery charge state before re-charging is not possible. For private use, for example in the case of a private charging station, the said functions can be linked, for example, to a smart home system.

Examples for implementing the method are explained in more detail below with the aid of flow charts. In Step 11 of the flow chart shown in FIG. 2, the current charge state of the battery 2, i.e., the electric energy currently stored in the battery 2, is detected. In Step 12, a target location is specified. This takes place via the input of a user 8 via an HMI 7. In Step 12, a route to the specified target location is furthermore specified by means of the navigation system 5. In Step 13, a final section of the route prior to reaching the target location is specified. The specification of the final section can be specified, for example, via individual inputs of the user 8 via the HMI 7 or depending on emission protection requirements which are detected, for example, via a Cloud or the navigation system 5, or globally as a specified range prior to reaching the target location.

In Step 14, a number of electrically operated devices and/or functions is specified, which are to be usable when covering the final section of the route, e.g., to enable driving maneuvers required at the target location to be implemented in various surroundings and under various conditions. The specification of the devices can take place automatically depending on the requirements of the target location, be preset globally irrespective of the respective target location, or be specified on the basis of corresponding inputs of a user 8.

Subsequently, in Step 15, the maximum required electric energy for covering the final section of the route under electric power alone whilst using the specified number of electrically operated devices and/or functions is estimated. In Step 16, which can contain Step 15, the maximum total electric energy required to cover the entire route, i.e., including the maximum required electric energy, estimated in Step 15, for covering the section under electric power alone, is estimated.

In Step 17, it is checked whether the detected stored electric energy is less than the estimated maximum total electric energy. If this is not the case, the method is ended in Step 18 or a notification is output, stating that the route can be implemented as planned. If, in Step 17, the detected stored electric energy is less than the estimated maximum total electric energy, it is determined in Step 19 whether an alternative route exists for which the detected stored electric energy is not less than the estimated maximum total electric energy.

If an alternative route exists, at least one alternative route is output in Step 20. If no alternative route exists, a notification is output via the HMI 7 in Step 21. The method can optionally be continued as described below.

Following Step 21, the minimum required electric energy for covering the final section of the route under electric power alone whilst using the specified electrically operated device and/or functions can be estimated. This step can be implemented additionally or alternatively to Step 21, following Step 19, and is referenced as Step 22 in FIG. 3. Following Step 22, in Step 23, the minimum total electric energy required to cover the entire route, including the minimum required electric energy, estimated in the previous step 22, for covering the final section under electric power alone, is estimated.

Subsequently, in Step 24, it is checked whether the detected stored electric energy is less than the estimated minimum estimated total energy. If this is not the case, a corresponding notification is output in Step 25, in particular containing that the route can be implemented on the basis of a minimum energy consumption. If, in Step 24, the detected stored electric energy is less than the estimated minimum total electric energy, it is determined in Step 26 whether an alternative route exists for which the detected stored electric energy is not less than the estimated minimum total electric energy. If no alternative route exists, a notification is output via the HMI 7 in Step 28 and/or the method is continued as described in FIG. 4. If an alternative route exists, at least one alternative route is output in Step 27.

The routine shown in FIG. 4 in the form of a flow chart can be implemented following Step 21 in FIG. 2 or following Step 28 in FIG. 3. In this example, in Step 30, which follows the said steps, the device and/or function which necessarily has to be usable when covering the final section of the route is selected from the specified electrically operated devices and/or functions which were specified as usable when covering the final section of the route in Step 14.

Subsequently, in Step 31, the maximum or minimum required electric energy for covering the final section of the route under electric power alone whilst using only the selected electrically operated device and/or functions is estimated. In Step 32, the necessary maximum or minimum total electric energy is estimated.

In Step 33, it is checked whether the detected stored electric energy is less than the necessary maximum and/or minimum total electric energy estimated in the previous step 32. If this is not the case, a corresponding notification is output in Step 34. If this is the case, it is determined in Step 35 whether an alternative route exists for which the detected stored electric energy is not less than the estimated maximum or minimum total electric energy. If an alternative route exists, at least one alternative route is output in Step 36. If no alternative route exists, a corresponding notification is output in Step 37.

In further examples, a user 8 can be shown a selection of devices and/or functions whose use can be restricted during the journey or during certain sections or which can be non-usable. In this case, it can be the maximum available drive torque which can be restricted. However, it can also be a maximum volume and/or a maximum brightness of available audiovisual media. Restricted use of the air conditioning or certain driver assistance functions can also be suggested. On the basis of such restricted use, the method described above can be implemented as described and an energy saving can be achieved, which possibly enables the destination to be reached with the desired autonomous driving maneuvers at the end of the journey.

In a further example, a route from the target location to a nearest charging station can be determined and energy still stored upon arriving at the target location, i.e., the charge state of the battery 2, can be estimated. In this example, the electric energy required to reach the nearest charging station from the target location can be estimated and, if the estimated required energy is less than the estimated still stored electric energy, a notification can be output.

LIST OF REFERENCE SIGNS

1 Vehicle
2 Battery
3 Drive train
4 Device for data processing
5 Navigation system
6 Driver assistance device
7 Human/machine interface (HMI)
8 User
11 Detecting the current charge state of the battery
12 Specifying a target location and a route to the specified target location
13 Specifying a final section of the route
14 Specifying a number of electrically operated devices and/or functions which are to be usable when covering the final section of the route
15 Estimating the maximum required electric energy for covering the final section of the route under electric power alone whilst using the specified number of electrically operated devices and/or functions
16 Estimating the maximum total electric energy required to cover the entire route
17 Is the detected stored electric energy less than the estimated maximum total electric energy?
18 End
19 Determining whether an alternative route exists for which the detected stored electric energy is not less than the estimated maximum total electric energy
20 Outputting at least one alternative route
21 Outputting a notification
22 Estimating the minimum required electric energy for covering the final section of the route under electric power alone whilst using the specified number of electrically operated devices and/or functions
23 Estimating the minimum total electric energy required to cover the entire route
24 Is the detected stored electric energy less than the estimated minimum total electric energy?
25 Outputting a notification
26 Determining whether an alternative route exists for which the detected stored electric energy is not less than the estimated minimum total electric energy
27 Outputting at least one alternative route
28 Outputting a notification
30 Selecting devices and/or functions which necessarily have to be usable when covering the final section of the route
31 Estimating the maximum or minimum required electric energy for covering the final section of the route under electric power alone whilst using only the selected electrically operated device and/or functions
32 Estimating the maximum or minimum total electric energy required to cover the entire route
33 Is the detected stored electric energy less than the estimated necessary maximum or minimum total electric energy?
34 Outputting a notification
35 Determining whether an alternative route exists for which the detected stored electric energy is not less than the estimated maximum or minimum total electric energy
36 Outputting at least one alternative route
37 Outputting a notification

The invention claimed is:

1. A method for determining a route for a vehicle that includes a hybrid drive with an electric drive that includes a battery and is powered electrically and a non-electric drive that is powered non-electrically, comprising:
    detecting an electric energy currently stored in the battery;
    specifying a target location and a route to the specified target location, wherein the route includes a plurality of sections including one or more sections under which the vehicle is driven at least in part by the non-electric drive and;
    a final section of the route that is determined based on a distance from the target location at which the vehicle is instructed to operate with the electric drive alone;
    specifying a number of electrically operated devices required to operate the vehicle along the final section of the route;
    estimating a maximum required electric energy for operating the vehicle along the final section of the route under electric power alone when using the specified number of electrically operated devices;
    estimating a maximum total electric energy required to operate the vehicle along the route based on the estimated maximum required electric energy for operating the vehicle along the final section of the route;
    determining an alternate route based on determining the detected stored electric energy is less than the estimated maximum total electric energy required to operate the vehicle along the route, wherein the alternate route is additionally determined based on an estimated maximum total electric energy required to operate the vehicle along the alternate route being greater than or equal to the estimated maximum total electric energy; and
    outputting, via a human/machine interface, one of a) the determined alternate route, or b) based on determining no alternate route exists, a notification.

2. The method according to claim 1, further comprising:
    estimating a minimum required electric energy for operating the vehicle along the final section of the route under electric power alone when using the specified electrically operated devices based on determining the detected stored electric energy is less than the estimated maximum total electric energy for operating the vehicle along the route and no alternative route exists;
    estimating a minimum total electric energy required for operating the vehicle along the route based on the minimum required electric energy for operating the vehicle along the final section of the route; and
    determining the alternate route based additionally on determining the detected stored electric energy is less than the estimated minimum total electric energy required for operating the vehicle along the route.

3. The method according to claim 1, further comprising:
selecting the specified electrically operated devices required to operate the vehicle along the final section of the route based on determining the detected stored electric energy is less than the estimated maximum total electric energy for operating the vehicle along the route and no alternative route exists;
estimating at least one of the maximum or a minimum required electric energy for operating the vehicle along the final section of the route under electric power alone when using only the selected electrically operated devices;
estimating at least one of the maximum or a minimum total electric energy required for operating the vehicle along the route under electric power alone when using only the selected electrically operated devices based on the corresponding maximum or minimum required electric energy for operating the vehicle along the final section of the route; and
determining the alternative route based additionally on determining the detected stored electric energy is less than the at least one of the estimated maximum or minimum total electric energy required for operating the vehicle along the route under electric power alone when using only the selected electrically operated devices.

4. The method according to claim 1, further comprising:
selecting the specified electrically operated devices required to operate the vehicle along the final section of the route based on determining the detected stored electric energy is less than the estimated minimum total electric energy for operating the vehicle along the route;
estimating at least one of the maximum or a minimum required electric energy for operating the vehicle along the final section of the route under electric power alone when using only the selected electrically operated devices;
estimating the at least one of the maximum or a minimum total electric energy required for operate the vehicle along the route under electric power alone when using only the selected electrically operated devices based on the corresponding maximum or minimum required electric energy for operating the vehicle along the final section of the route; and
determining the alternative route based additionally on determining the detected stored electric energy is less than the at least one of the estimated maximum or minimum total electric energy required for operating the vehicle along the route under electric power alone when using only the selected electrically operated devices.

5. The method according to claim 1, further comprising:
determining a second route from the target location to a nearest charging station;
estimating the electric energy stored in the battery upon arriving at the target location;
estimating an electric energy required to operate the vehicle along the second route from the target location to the nearest charging station; and
outputting a notification via the human/machine interface based on the estimated required electric energy being less than the estimated stored electric energy.

6. The method according to claim 1, further comprising:
determining whether, while the vehicle operates along the route, electric energy can be saved by restricting use of certain functions; and
outputting a notification via a human/machine interface identifying the restricted use functions and a corresponding energy saving.

7. The method according to claim 6, further comprising:
outputting restricted use functions via the human/machine interface based on determining the detected stored electric energy is less than a) the estimated maximum total electric energy required for operating the vehicle along the route, or b) an estimated minimum total electric energy required for operating the vehicle along the route;
selecting a number of the outputted restricted use functions; and
estimating at least one of the maximum or a minimum total electric energy required for operating the vehicle along the route based on the selected restricted use functions.

8. The method according to claim 6, wherein the functions include at least one of a maximum available drive torque, a volume of at least one speaker, a brightness of at least one display, an air conditioning control, or a driver assistance function.

9. The method according to claim 1, further comprising determining and outputting at least one charging option along the route via a human/machine interface.

10. The method according to claim 1, further comprising, upon determining the detected stored electric energy is greater than or equal to the estimated maximum total electric energy required to operate the vehicle along the route, operating the vehicle along the route.

11. A system, comprising a device for data processing in a vehicle that includes a hybrid drive with an electric drive that includes a battery and is powered electrically and a non-electric drive that is powered non-electrically, the device including a processor configured to:
detect an electric energy currently stored in a battery configured to electrically power a drivetrain;
specify a target location and a route to the specified target location, wherein the route includes a plurality of sections including one or more sections under which the vehicle is driven at least in part by the non-electric drive and
specify a final section of the route that is determined based on a distance from the target location at which the vehicle is instructed to operates with the electric drive alone;
specify a number of electrically operated devices required to operate the vehicle along the final section of the route;
estimate a maximum required electric energy for operating the vehicle along the final section of the route under electric power alone when using the specified number of electrically operated devices;
estimate a maximum total electric energy required to operate the vehicle along the route based on the estimated maximum required electric energy for operating the vehicle along the final section of the route;
determine an alternate route based on determining the detected stored electric energy is less than the estimated maximum total electric energy required to operate the vehicle along the route, wherein the alternate route is additionally determined based on an estimated maximum total electric energy required to operate the vehicle along the alternate route being greater than or equal to the estimated maximum total electric energy; and output, via a human/machine interface, one of a) the determined alternate route, or b) based on determining no alternate route exists, a notification.

12. The vehicle of claim 11, wherein the processor is further configured to:
estimate a minimum required electric energy for operating the vehicle along the final section of the route under electric power alone when using the specified electrically operated devices based on determining the detected stored electric energy is less than the estimated maximum total electric energy for operating the vehicle along the route and no alternative route exists;
estimate a minimum total electric energy required for operating the vehicle along the route based on the minimum required electric energy for operating the vehicle along the final section of the route; and
determine the alternate route based additionally on determining the detected stored electric energy is less than the estimated minimum total electric energy required for operating the vehicle along the route.

13. The vehicle of claim 11, wherein the processor is further configured to:
select the specified electrically operated devices required to operate the vehicle along the final section of the route based on determining the detected stored electric energy is less than the estimated maximum total electric energy for operating the vehicle along the route and no alternative route exists;
estimate at least one of the maximum or a minimum required electric energy for operating the vehicle along the final section of the route under electric power alone when using only the selected electrically operated devices;
estimate at least one of the maximum or a minimum total electric energy required for operating the vehicle along the route under electric power alone when using only the selected electrically operated devices based on the corresponding maximum or minimum required electric energy for operating the vehicle along the final section of the route;
determine the alternative route based additionally on determining the detected stored electric energy is less than the at least one of the estimated maximum or minimum total electric energy required for operating the vehicle along the route under electric power alone when using only the selected electrically operated devices.

14. The vehicle of claim 11, wherein the processor is further configured to:
select the specified electrically operated devices required to operate the vehicle along the final section of the route based on determining the detected stored electric energy is less than the estimated minimum total electric energy for operating the vehicle along the route;
estimate at least one of the maximum or a minimum required electric energy for operating the vehicle along the final section of the route under electric power alone when using only the selected electrically operated devices;
estimate the at least one of the maximum or a minimum total electric energy required for operating the vehicle along the route under electric power alone when using only the selected electrically operated devices based on the corresponding maximum or minimum required electric energy for operating the vehicle along the final section of the route;
determine the alternative route based additionally on determining the detected stored electric energy is less than the at least one of the estimated maximum or minimum total electric energy required for operating the vehicle along the route under electric power alone when using only the selected electrically operated devices.

15. The vehicle of claim 11, wherein the processor is further configured to:
determine a second route from the target location to a nearest charging station;
estimate the electric energy stored in the battery upon arriving at the target location;
estimate an electric energy required to operate the vehicle along the second route from the target location to the nearest charging station; and
output a notification via the human/machine interface based on the estimated required electric energy being less than the estimated stored electric energy.

16. The vehicle of claim 11, wherein the processor is further configured to:
determine whether, while the vehicle operates along the route, electric energy can be saved by restricting use of certain functions; and
output a notification via a human/machine interface identifying the restricted use functions and a corresponding energy saving.

17. The vehicle of claim 16, wherein the processor is further configured to:
output restricted use functions via the human/machine interface based on determining the detected stored electric energy is less than a) the estimated maximum total electric energy required for operating the vehicle along the route, or b) an estimated minimum total electric energy required for operating the vehicle along the route;
select a number of the outputted restricted use functions; and
estimate at least one of the maximum or a minimum total electric energy required for operating the vehicle along the route based on the selected restricted use functions.

18. The vehicle of claim 16, wherein the functions include at least one of a maximum available drive torque, a volume of at least one speaker, a brightness of at least one display, an air conditioning control, or a driver assistance function.

19. The vehicle of claim 11, wherein the processor is further configured to determine and output at least one charging option along the route via a human/machine interface.

20. The vehicle of claim 11, wherein the processor is further configured to, upon determining the detected stored electric energy is greater than or equal to the estimated maximum total electric energy required to operate the vehicle along the route, operate the vehicle along the route.

* * * * *

UNITED STATES PATENT AND TRADEMARK OFFICE
CERTIFICATE OF CORRECTION

PATENT NO. : 11,680,810 B2
APPLICATION NO. : 17/121897
DATED : June 20, 2023
INVENTOR(S) : Thomas Gerlitz et al.

Page 1 of 1

It is certified that error appears in the above-identified patent and that said Letters Patent is hereby corrected as shown below:

In the Claims

Claim 11, Column 12, Line 46 replace "instructions to operates with" with "--instructions to operate with--"

Signed and Sealed this
Twenty-fifth Day of July, 2023

Katherine Kelly Vidal
*Director of the United States Patent and Trademark Office*